Figure 1:
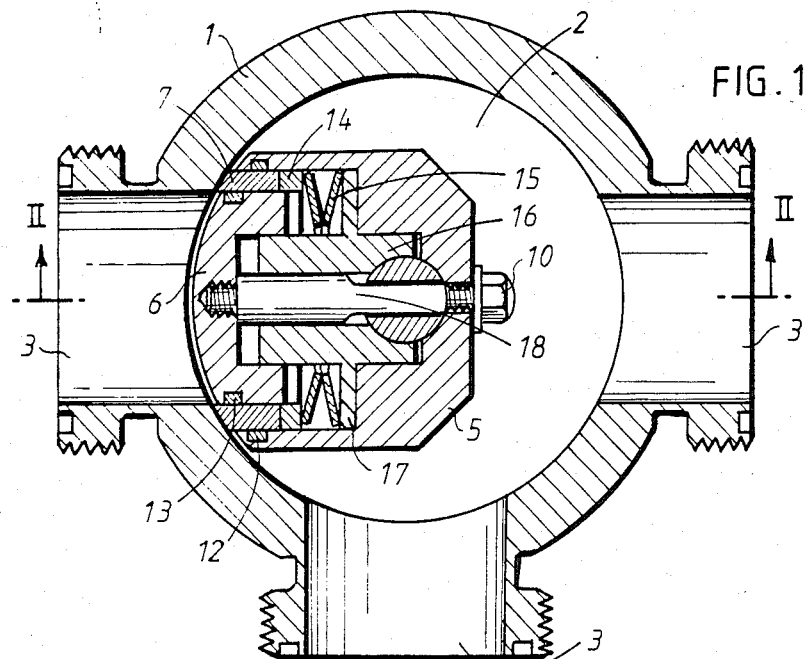

United States Patent [19]

Niskanen

[11] Patent Number: 4,526,200

[45] Date of Patent: Jul. 2, 1985

[54] BLOCKING VALVE FOR LIQUIDS

[75] Inventor: Erkki Niskanen, Helsinki, Finland

[73] Assignee: Erkki Niskanen Oy, Helsinki, Finland

[21] Appl. No.: 661,312

[22] Filed: Oct. 16, 1984

[30] Foreign Application Priority Data

Oct. 17, 1983 [FI] Finland .................................. 833776

[51] Int. Cl.³ ............................................. F16K 11/08
[52] U.S. Cl. ............................... 137/625.47; 251/177; 251/298; 251/303
[58] Field of Search .................... 137/625.47; 251/176, 251/177, 180, 183, 298, 303, 163

[56] References Cited

U.S. PATENT DOCUMENTS

| 45,949 | 1/1865 | Murray | 251/177 |
| 3,572,370 | 3/1971 | Eugle | 251/163 X |
| 4,436,116 | 3/1984 | Billeter | 251/177 X |

FOREIGN PATENT DOCUMENTS 1064308 8/1965 Fed. Rep. of Germany ...... 251/177

Primary Examiner—Harold W. Weakley
Attorney, Agent, or Firm—Cushman, Darby & Cushman

[57] ABSTRACT

The invention is concerned with a blocking valve for liquids, which valve comprises a body (1), which forms a cylindrical valve housing (2) that is provided with flow openings (3), and a spindle (4) turnably mounted in the valve housing, the said spindle being turnable between a blocking position covering the flow opening in the valve housing and an open position liberating the flow opening, and the said spindle comprising a stationary body part (5) and a blocking part (6). In order to avoid the detrimental effect of inside pressure and pressure impacts in the valve on the seal (7), on one hand, and the effect of pressure and pressure impacts outside the valve on the blocking part (6), on the other hand, the procedure in the valve in accordance with the invention has been such that the body part (5) substantially surrounds the central blocking part (6), fitted stationary relative the body part, from the side of the valve housing (2), that the seal (7) for sealing the valve housing (2) relative the flow opening (3) is fitted between the stationary body part (5) and the stationary blocking part (6), and the pressure at the seal (7) can be adjusted in a way in itself known.

5 Claims, 3 Drawing Figures

U.S. Patent

Jul. 2, 1985

4,526,200

BLOCKING VALVE FOR LIQUIDS

The present invention is concerned with a blocking valve for liquids, which valve comprises a body, which forms a cylindrical valve housing that is provided with flow openings, and a spindle turnably mounted in the valve housing, the said spindle being turnable between a blocking position covering the flow opening in the valve housing and an open position liberating the flow opening, and the said spindle comprising a stationary body part and a blocking part.

It is known in prior art, in similar blocking valves, to install the slide acting as the blocking member in the valve housing as movable in the radial direction relative the centre axis of the valve housing and to fit the slide so that it is subject to the effect of a spring, whereat the spring force presses the sealing face of the slide against the sealing face surrounding the flow opening of the valve housing with an adequate force so that the necessary sealing is achieved. The external pressure prevailing in the flow opening acts upon the entire blocking face of the solid slide, attempting to press the slide open, out of which reason the spring force must be dimensioned to such an extent higher, than would be required by the sealing pressure alone, that the slide is not opened and does not leak by the effect of the external pressure prevailing in the flow opening or by the effect of pressure impacts that may occur. This, however, makes the turning of the slide between the open position and the blocking position more difficult, and the torque required for turning the slide is increased further if an internal pressure prevailing in the valve housing also acts upon the slide.

Moreover, in the present-day blocking valves, the slide constructions are frequently open, i.e. the liquid flowing through the valve can reach contact with the slide and with the spring and penetrate into the various slots, which makes the cleaning of the valve difficult and causes a risk of contamination.

Moreover, it is known in prior art that, by making the slide out of two parts so that it comprises a central, radially stationary blocking part and a radially mobile sealing part, the external pressure prevailing in the flow opening can be received by means of the stationary blocking part, which does not load the sealing part of the slide at all. Thus, the sealing part of the slide can be made free from the effects of external pressure, and the pressing of the sealing part against the sealing face of the valve housing can be dimensioned in accordance with lower press forces. In connection with this prior-art construction, in order to obtain a closed construction, it has, however, been necessary to use a membrane as the sealing part, which results in the use of a spherical valve housing. In this construction, an internal pressure impact in the valve housing may additionally have resulted in the membrane being stuck between the moving parts.

The object of the present invention is to provide a blocking valve in which a stationary blocking part, receiving the pressure, is used but in which no membrane is needed as the sealing part and, consequently, no spherical valve housing either, which type of valve housing is difficult to machine and has a small top opening for the insertion of the parts, but it is possible to use a cylindrical housing.

This has been accomplished by means of the blocking valve in accordance with the invention, which is characterized in that the body part substantially surrounds the central blocking part, fitted stationary relative the body part, from the side of the valve housing, that the seal for sealing the valve housing relative the flow opening is fitted between the stationary body part and the stationary blocking part, and that the pressure at the seal can be adjusted in a way in itself known.

Since, in the construction in accordance with the present invention, the body part of the valve spindle substantially surrounds the stationary blocking part from the side of the valve housing, the play between the stationary body part and the valve body can be made little. By means of this construction of the body part, extrusion of the seal out of its position is prevented, so that it is possible to use softer seal materials. Suitable seals are an annular cylinder seal, which may made of a metal or plastic, e.g. teflon.

Figure 2:
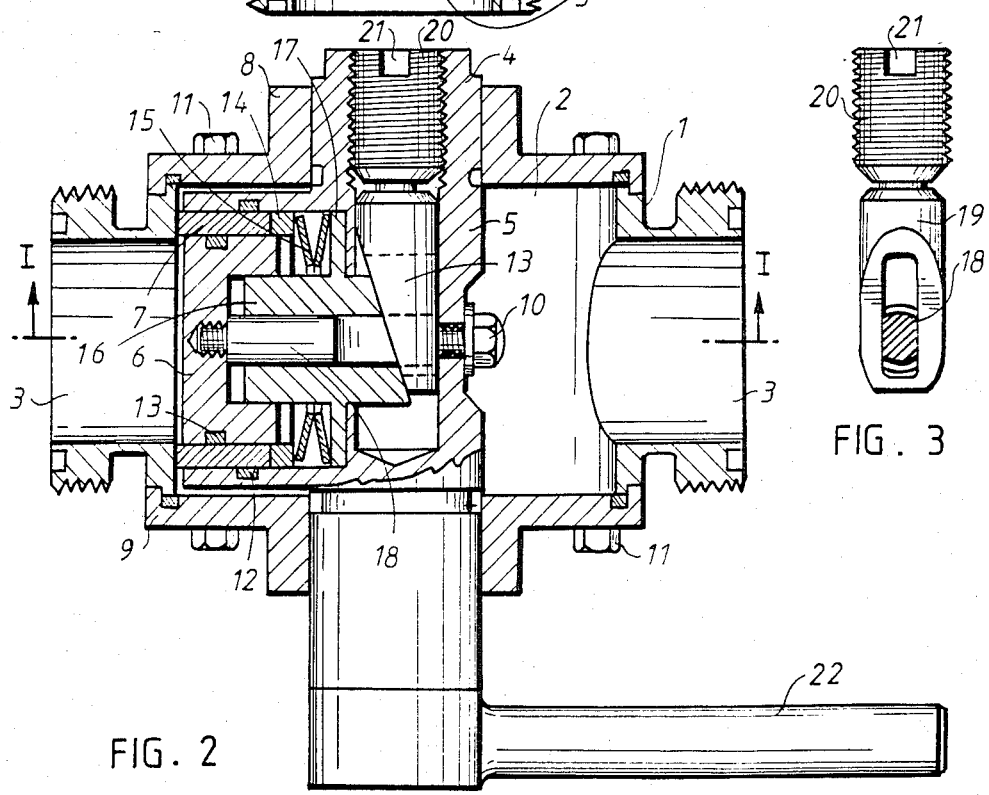
Figure 3:
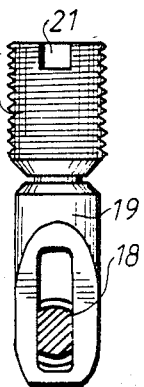

In the following, the blocking valve in accordance with the invention will be described in more detail with reference to the attached drawing, wherein FIG. 1 is a sectional top view of an embodiment of the valve in accordance with the invention, FIG. 2 is a sectional side view of a valve in accordance with the invention as a section along line II—II in FIG. 1, and FIG. 3 shows the wedge member used for setting the pressure at the seal.

The blocking valve shown in the drawing comprises a body 1, which forms a cylindrical valve housing 2 provided with three flow openings 3 with threaded connections. The top and the bottom of the valve housing is closed by covers 8 and 9 attached by means of bolts 11, a spindle 4 turnable by means of a crank 22 being journalled to the said covers coaxially with the valve housing 2. The spindle 4 is connected with a stationary, radially projecting body part 5, made of one piece with the spindle. The body part 5 forms a cylindrical housing, into which the blocking part 6 is fitted and attached permanently into its position by means of a guide part 18, which passes through the body part 5 and is axial relative the said body part, the said guide part 18 being either made of one piece or connected with the blocking part 6 by means of a threaded joint. By means of the guide part 18, the blocking part 6 can be brought to the desired radial distance from the spindle 4. Into the annular space between the blocking part 6 and the housing formed by the body part 5, an annular cylindrical seal 7 is fitted, which seal is sealed relative the body part 5 and the blocking part 6 by means of seal rings 12 and 13, respectively. Behind the seal 7, in the same annular space with it, an equalizing ring 14 is fitted, which is arranged so that a cup spring 15, producing the pressure on the seal, acts upon the said ring 14. The other counter-face of the cup spring 15 consists of the annular flange 17 of the inner part 16 fitted as gliding in the bore formed centrally in the body part 5 and the blocking part 6. The inner part 16 is cylindrical, and the cylindrical guide part 18 connected with the blocking part 6 is passed through the said inner part 16, the blocking part 6 being attached to the body part 5 by means of a box nut 10 threaded onto the threading formed at the end of the said guide part 18. The counter face of the inner part 16 placed next to the axis of the spindle 4 is formed diagonal, and a wedge member 19 fitted into a centrally formed bore in the spindle 4 is arranged as acting upon the said diagonal counter-face. By means of the wedge member, the inner part 16 can be made to glide in its bore and, thereby, to change the force acting upon the cup spring 15 and, consequently, the pressure on the seal 7. At the top end of the wedge member 19, a peg 20 is fitted which is provided with a threading so as to be turnable relative the wedge member and which is arranged so as to be turnable in the threading formed into the central bore in the spindle 4. By turning the peg 20 by means of the groove 21 formed at its end, the location of the wedge member 19 in the bore and, consequently, the pressure on the seal 7 can be altered. Onto the guide part 18, before the threaded portion onto which the nut 10 has been threaded, plane guide faces have been formed at which the guide part is located in the oblong hole in the wedge member 19, so that the turning of the guide part 18 and, thereby, of the blocking part 6 around their axes is excluded.

In the valve in accordance with the invention, the body part 5 is made of one piece with the spindle 4, and thereby it has been possible to eliminate the detrimental effect of the pressure prevailing inside the valve and of pressure impacts on the seal 7. Pressures and pressure impacts coming from outside the valve have been eliminated so that the blocking member has been divided into two parts, i.e. a stationary blocking part and a mobile seal. Thereby, the surface pressure acting upon the seal is low and controlled. Moreover, the spring force of the cup spring 15 acts upon the seal 7 only. Since the seal 7 obtains its guiding from both sides, on one hand from the body part 5 and, on the other hand, from the blocking part 6, and since the play between the body part and the valve housing has been made little, e.g. less than 0.1 mm, it is possible to use a low spring force and a soft seal without a risk of the seal being extruded out of its position.

The drawing and the related description are only supposed to illustrate the idea of the invention. In its details, the valve in accordance with the invention may show even considerable variation within the scope of the attached patent claims.

What is claimed is:

1. Blocking valve for liquids, which valve comprises a body (1), which forms a cylindrical valve housing (2) that is provided with flow openings (3), and a spindle (4) turnably mounted in the valve housing, the said spindle being turnable between a blocking position covering the flow opening in the valve housing and an open position liberating the flow opening, and the said spindle comprising a stationary body part (5) and a blocking part (6), characterized in that the body part (5) substantially surrounds the central blocking part (6), fitted stationary relative the body part, from the side of the valve housing (2), that the seal (7) for sealing the valve housing (2) relative the flow opening (3) is fitted between the stationary body part (5) and the stationary blocking part (6), and that the pressure at the seal (7) can be adjusted in a way in itself known.

2. Blocking valve as claimed in claim 1, characterized in that the seal (7) is an annular cylinder seal, which is located in the cylindrical space between the stationary body part (5) and the stationary blocking part (6).

3. Blocking valve as claimed in claim 1, characterized in that inside the stationary body part (5), a cylindrical housing, radial relative the spindle (4), has been formed, the blocking part (6) being fitted as stationary inside the said housing by means of a guide part (18), passing through the body part (5) and connected with the blocking part, and a nut (10) threaded onto the end of the said guide part.

4. Blocking valve as claimed in claim 3, characterized in that the guide part (18) securing the blocking part (6) passes through a mobile inner part (16), used for setting the pressure of the seal (7), and through a wedge member (19) fitted as acting upon the said mobile inner part (16).

5. Blocking valve as claimed in claim 4, characterized in that at the portion of the guide part (18) that passes through the oblong hole in the wedge member (19), plane guide faces have been formed, which prevent turning of the guide part and, thereby, of the blocking member (6) around their axes.

* * * * *